| United States Patent [19] | [11] | 4,322,443 |
|---|---|---|
| Frontczak | [45] | Mar. 30, 1982 |

[54] METHODS OF PRODUCING FODDER

[75] Inventor: Stanislaw Frontczak, Lodz, Poland

[73] Assignee: Jacek Dlugolecki, Gdansk, Poland; a part interest

[21] Appl. No.: 123,203

[22] Filed: Feb. 21, 1980

[30] Foreign Application Priority Data

Jan. 26, 1980 [GB] United Kingdom ............... 02710/80

[51] Int. Cl.$^3$ .......................... A23K 1/00; A23K 1/14
[52] U.S. Cl. ........................................ 426/28; 426/46; 426/623; 426/630; 426/54; 47/56
[58] Field of Search ............... 426/289, 615, 618, 623, 426/635, 630, 807, 28, 44, 46, 54; 47/59, 61, 62, 64, 65

[56] References Cited

U.S. PATENT DOCUMENTS

| 1,554,913 | 9/1925 | Grelick | 426/623 |
|---|---|---|---|
| 2,178,051 | 10/1939 | Sams | 426/635 |
| 3,131,064 | 4/1964 | Malchair | 47/62 |
| 4,175,355 | 11/1979 | Dedolph | 47/64 |
| 4,180,941 | 1/1980 | Korematsu | 47/61 |

Primary Examiner—Raymond N. Jones
Assistant Examiner—Elizabeth J. Curtin
Attorney, Agent, or Firm—Roylance, Abrams, Berdo & Farley

[57] ABSTRACT

Methods of producing fodder are disclosed in which a layer of peat is sown with seeds of quick-growing variety producing strong root systems.

The layer of peat is allowed to remain undisturbed for a period of days after which the peat with the then germinated seeds is suitable for use as fodder.

In one embodiment the layer of peat is disposed on a surface impermeable to plant roots.

The seeds may be introduced into the peat before or after formation of the layer.

10 Claims, No Drawings

METHODS OF PRODUCING FODDER

The present invention relates to methods of producing fodder.

In a known method of producing fodder, products containing carbohydrates or other chemical substances are added to disaggregated and screened peat. The resulting mixture is used as fodder. However, it has been found that such fodder is not particularly suitable for the digestive systems of higher-order animals, particularly breed stock.

It is also known to include peat, as a fodder component. In such a case, the peat after being screened, is mixed with a solution of casein obtained by dissolving casein at an elevated temperature. For this purpose, curd in an aqueous solution of sodium carbonate or an aqueous solution of molasses may be used. The preparation of such a mixture requires containers of a relatively large capacity as well as a heating installation. As a result, production of such fodder is a relatively expensive process. The constituents such as molasses, and especially curds, are relatively expensive. Also, the cost of the necessary energy to produce the elevated temperature is relatively high.

According to the invention, there is provided a method of producing fodder in which seeds of at least one quick germinating plant of a type such as to produce strong root systems are sown in peat which is allowed to lie on a surface impermeable to plant roots in a layer having a quantity of at least 500 Kg of seeds per hectare for a vegetation period of between 22 and 40 days, whereafter the peat layer with the germinated seeds is usable as fodder.

Preferably, said seeds are a mixture of at least two quick germinating plant types such as to produce strong root systems.

Preferably, said seeds include those of at least one of the following plant types: oats, rye; vetch; lupine; field peas; and soya.

Preferably said layer of peat has a thickness in the range of from 75 mm to 175 mm.

The peat layer with the germinated seeds may be dried before use as fodder or may be ensilaged before use as fodder.

The peat layer may be allowed to remain undisturbed for a vegetation period of thirty days.

It is possible to mix the seeds with the peat before the formation of the layer of peat, and it is alternatively possible to sow said seeds in said peat after the formation of said layer of peat.

For a better understanding of the invention, and to show how the same may be carried into effect, reference will now be made to a number of examples of methods of producing fodder.

In a first example, a mass of disaggregated peat is layed on a surface which is impermeable to plant roots in a layer of about six inches thickness. The impermeable surface may be mechanically hardened soil, a layer of foil, a layer of roofing paper, or a concrete surface. When the layer of peat has been formed, a seed mixture composed of each of the following seed types is made up. The seed types are: rye; oats; vetch; and field peas. The seed mixture is then sown in the peat at a density of 650 Kg of seed mixture per hectare. The peat layer is then allowed to lie undisturbed for a vegetation period of 30 days of 24 hours. During this period it is watered in the conventional manner. Natural germination of the seeds as well as natural development of root systems of the plants sown in the peat layer precedes during the vegetation period.

In parallel with the germination of the seeds, a biological process initiated by the development and presence of the plant root systems proceeds in the layer of peat. This biological process has not been fully investigated but has the effect of transforming the peat layer into a substance suitable for the digestive systems of livestock. After 30 days have passed, the vegetation process is interrupted by collecting the biologically transformed peat layer including the seedlings. The collected mixture can be subjected to a drying process as a result of which 120 Kg of dry material per square meter can be obtained.

If desired, conventional fodder in a double weight portion can be added to the dry material and the resulting mixture utilised for feeding of, for example, cows and sheep. In experiments, it has been found that the animals weight increase is similar to the weight increase of such animals fed by conventional fodder.

Generally speaking, the thickness of the peat layer should be in the range of from 3 inches to 7 inches and the seeds will include those of at least two types of plant such as oats, rye, vetch, lupine, field peas, soya, and similar plants. The seeds should be sown at a density of at least 500 Kg per hectare, and the vegetation period should be at least 22 days but no longer than 40 days. The seeds should be those of quick germinating plants of a type such as to form strong root systems.

The mixture of peat and germinated seeds may be applied as fodder in a wet state, or after being dried, or after the known fermentation process known as ensilage.

The mixture of peat and germinated seeds may be supplemented by the addition of up to 75 percent by weight of conventional fodder, the percentage being based upon the weight of the entire resulting mixture.

It is also possible to mix the seeds with the peat before the formation of the peat layer e.g. using conventional mixing and sowing machines equipped with seed metering devices.

It will be realised that normally peat is unsuitable as a fodder material for livestock. However, the described methods enable this relatively cheap material to be converted to a material acceptable to the digestive systems of higher order livestock. The main part of the process, in other words the biological part, does not require application of any energy and requires practically no physical effort.

The biological transformation process which takes place in the peat is not fully understood but results in activation of alimentary substances in the peat. It appears to result from a coaction between micro-organisms in the peat and the plant roots.

In some circumstances, breed animals fed with the resulting fodder demonstrate a higher daily weight increase than similar breed animals fed on traditional fodder. It has also been found that the animals fed by the new fodder exhibit excellent health and appetite. The fodder production process can be performed on soil which is inconvenient for normal agricultural purposes and several production cycles per year may be carried out, for example in the winter season.

It has been established in tests that between 20 and 30 lbs per square foot can be obtained during one production cycle.

I claim:

1. A method of producing fodder, comprising the steps of
    forming a layer of peat having a thickness in the range of about 75 to about 175 millimeters on a surface substantially impermeable to plant roots;
    sowing into the layer of peat seeds of at least one quick germinating plant of a type such as to produce strong root systems at a rate of at least about 500 kilograms of seeds per hectare; and
    vegetating the seeds for a period in the range of about 22 to about 40 days;
    whereby the layer of peat with germinated seeds is usable as fodder.

2. A method according to claim 1, wherein the seeds comprise a mixture of at least two quick-germinating plant types such as to produce strong root systems.

3. A method according to claim 1, wherein the seeds comprise one or more of the plant types of the group consisting of oats, rye, vetch, lupine, field peas and soya.

4. A method according to claim 1, further comprises drying the layer of peat with germinated seeds before use as fodder.

5. A method according to claim 1, further comprises ensiling the layer of peat with germinated seeds before use as fodder.

6. A method according to claim 1, wherein the layer of peat with the seeds remains undisturbed for a vegetation period of about 30 days.

7. A method according to claim 1, wherein the seeds are mixed with the peat before forming the layer of peat.

8. A method according to claim 1, wherein the seeds are sown in the peat after forming the layer of peat.

9. A method according to claim 1, further comprises mixing the layer of peat having germinated seeds with up to about 75 percent by weight of conventional fodder.

10. Fodder produced by the method of claim 1, 2, 3, 4, 5, 6, 7, 8 or 9.

* * * * *